Patented Dec. 6, 1938

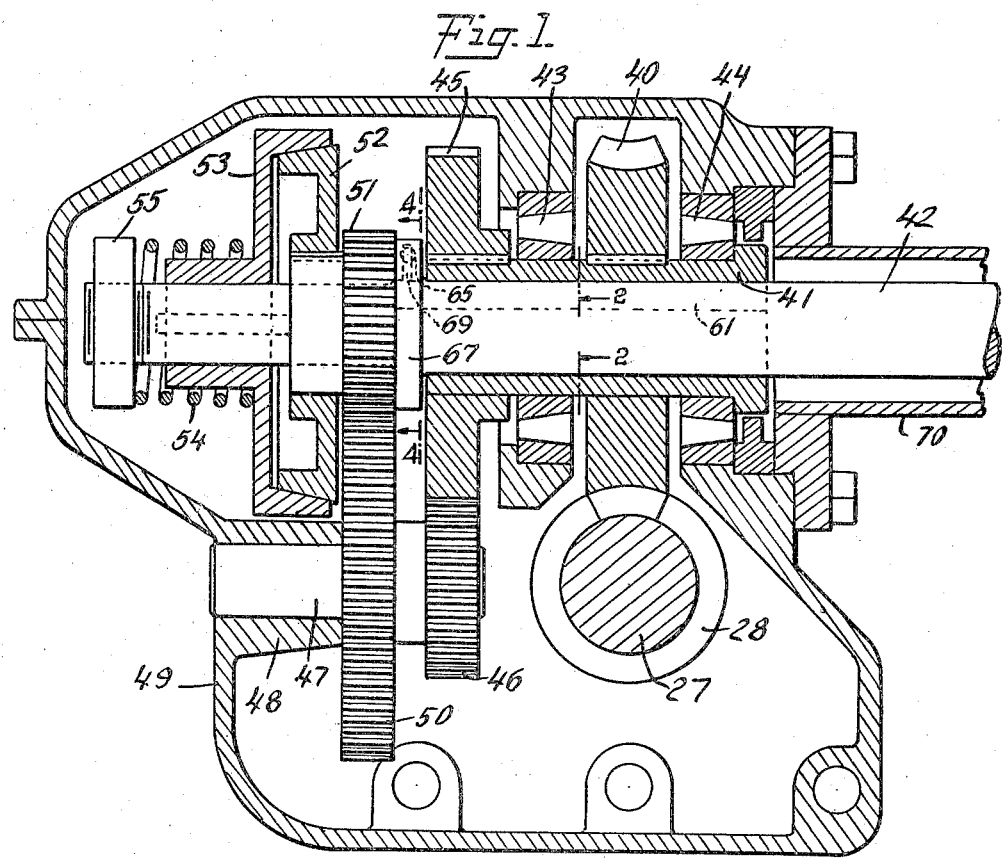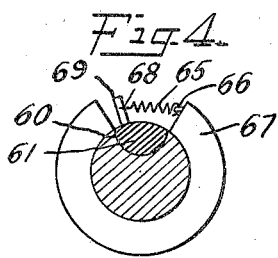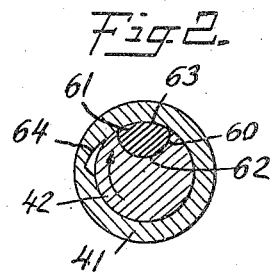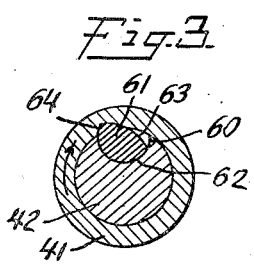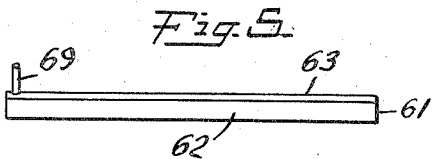

2,139,221

UNITED STATES PATENT OFFICE 2,139,221

DRIVING MECHANISM

Wilhelm B. Bronander, Montclair, N. J.

Application April 24, 1936, Serial No. 76,159

5 Claims. (Cl. 74—337)

This invention relates to driving mechanism.

Although not limited to this particular use the invention has been developed in connection with a drive for screwing or "running" nuts on the bolts or for unscrewing nuts from the bolts used to connect the fish plates to each other and to the rails on railway tracks.

It is most essential for the proper joining of the rails on a railroad that the fish plates or plates used to join rails be tightly and securely held in place. The nuts which secure the fish plate bolts are often rusted on the bolts and it is very difficult to loosen and unscrew them to permit new bolts to be put in place.

Driving mechanism for the purpose specified must meet certain definite requirements. When the nuts are being "run" on the bolts a relatively high speed of operation is possible and desirable. However, when the nut starts to tighten on the bolt more torque and less speed is essential. The reverse is true in loosening the nuts, that is, relatively slow speed and greater torque to loosen the nuts and a relatively high speed for unscrewing the loosened nuts.

This invention has for its salient object to provide driving mechanism for the purpose specified so connstructed and arranged that under predetermined torque conditions the rate of speed of the drive will be automatically reduced and the torque furnished will be automatically increased.

Further objects of the invention will appear from the following specification taken in connection with the drawings which form a part of this application, and in which Fig. 1 is an enlarged sectional elevation taken through the driving connections constructed in accordance with the invention;

Fig. 2 is a transverse sectional elevation taken substantially on line 2—2 of Fig. 1, the shafts being shown in the relative positions taken when the drive is being transmitted at high speed;

Fig. 3 is a view similar to Fig. 2 but showing the elements directly connected for transmitting the drive at direct speed;

Fig. 4 is a detail sectional elevation taken substantially on line 4—4 of Fig. 1 showing a detail of the automatically operatable clutch mechanism; and Fig. 5 is an elevational view of the key or clutch member which automatically connects the two driving elements for direct drive.

The invention briefly described consists of driving connections between a drive shaft and a driven shaft, operatable to transmit the drive between the shafts at a speed higher than direct drive during the normal operation of the driving connection, but automatically shiftable under predetermined torque conditions to change the drive from high speed or "overdirect" drive to direct drive.

Further details of the invention will appear from the following description.

In the embodiment of the invention illustrated, a power shaft 27 is provided with a worm 28 which meshes with a worm wheel or gear 40 which is keyed to a hollow shaft or sleeve 41 mounted on the driven shaft 42. The hollow shaft 41 is supported in roller bearings 43 and 44 and has also secured thereto a gear 45 which meshes with and drives a gear 46 mounted on a spindle 47. The spindle 47 is mounted in a boss 48 formed on the transmission casing 49 which houses the transmission.

A second gear 50 is secured to the gear 46 and meshes with a gear 51 which is rotatably mounted on the shaft 42. Gear 51 has secured thereto a friction clutch or driving member 52 which engages a second friction clutch or driving member 53, this latter member 53 being secured or keyed to the shaft 42. The pressure between the friction elements 52 and 53 is determined by a coil spring 54 which is pressed against the member 53 and at its outer end engages an adjustable nut 55 mounted on the end of the shaft 42.

The driving connections above described because of the gear ratios transmit the drive from the worm 28 to the shaft 42 at a relatively high or overdirect speed. The drive is transmitted successively through the following elements: Gear 40, hollow shaft 41, gears 45, 46, 50, 51, friction clutch members 52, 53 and thence to the shaft 42.

When greater resistance is encountered by a wrench or other tool driven by the shaft 42 a greater torque effort is required to complete the operation on which the tool is being used, such for instance, as the final tightening of a nut on a fish plate bolt. In order to provide this extra torque effort means is incorporated in the transmission for automatically shifting from the high or overdirect speed to direct speed under predetermined torque conditions. This is accomplished by means in the nature of an overrunning clutch. In the form of the invention shown the shaft 42 is provided with a longitudinal groove 60 in which is mounted a clutch element 61. This element, as shown in Figs. 3 and 6, consists of a longitudinally extending irregularly shaped member having an arcuate surface 62 conforming in shape to the curvature of the longitudinal groove or recess 60 and having a second arcuate surface or an outer arcuate surface 63 which is curved on an arc corresponding to the periphery of the shaft 42. Thus, as shown in Fig. 2, during the normal operation of the drive the member 61 seats completely in the groove 60 and the outer surface of the member 61 completes the peripheral surface of the shaft 42.

The inner surface of the hollow shaft 41 has formed therein a longitudinal notch 64 so shaped as to receive an edge portion of the member 61, as shown in Fig. 3.

When the shaft 42 is rotating faster than the hollow shaft 41 the clutch member 61 will be seated in the groove 60 in the manner shown in Fig. 2 and will not function. However, when predetermined torque conditions have slowed down the shaft 42 so that this shaft is rotating at a speed less than the speed of rotation of the shaft 41 the clutch member 61 will be swung outwardly into the longitudinal notch or groove 64 formed on the inner surface of the shaft 41. This relative change in the speed of the two shafts is permitted by the friction drive through the clutch or driving elements 52, 53.

The shifting of the clutch member 61 is assisted or aided by a spring 65, one end of which is secured at 66 to a collar 67 formed on the shaft 42, the other end of the spring being secured at 68 to a pin 69 which is secured to and projects outwardly from the member 61. The spring 65 tends to swing the clutch member 61 on its longitudinal axis but is not permitted to operate during the normal operation of the drive when the shaft 42 is rotated faster than the hollow shaft 41. However, when the relative speed of rotation of these shafts has reversed or, in other words, when the shaft 41 is rotating faster than the driven shaft 42 the spring causes the member 61 to swing on its longitudinal axis to the position shown in Fig. 3 whereupon the two shafts are directly connected and the high speed driving connections will be rendered inoperative.

From the foregoing specification it will be evident that simple, practical and effective means have been provided for automatically controlling the drive in such a way that under predetermined torque conditions the drive will be shifted from high speed or overdirect speed to direct drive.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What I claim is:

1. In combination, a tool drive comprising a drive shaft, a driven shaft operatively connected to the tool, driving connections including a constantly engaging friction drive and gearing for driving the driven shaft at a speed greater than the speed of the driving shaft, said friction driving connection comprising elements disposed at all times in frictional operative driving engagement with each other, and driving connections between said shafts for driving the driven shaft and tool at the same speed as the driving shaft, said last named driving connections including an overrunning clutch, between the driving and driven shafts, automatically operable to directly connect said shafts when the torque on the driven shaft has slowed down the driven shaft to a speed equal to or below the speed of the drive shaft.

2. A hollow drive shaft, a driven shaft mounted in said drive shaft, means including gearing and a friction clutch operatively connecting said shafts to drive the driven shaft at a higher rate of speed than the speed of the drive shaft, said friction driving connection comprising elements disposed at all times in frictional operative driving engagement with each other, and a one way clutch between the shafts for driving the driven shaft at the same speed as the drive shaft, said one way clutch being automatically set in operation when the driven shaft is slowed down to a speed lower than the speed of the drive shaft.

3. A drive shaft, a driven shaft, operative driving connections, including a constantly engaging friction driving connection between said shafts, for driving the driven shaft at a higher speed than the speed of the driving shaft, said frictional driving connection comprising elements disposed at all times in driving engagement with each other, a one-way clutch for directly connecting the driving shaft to the driven shaft, said one-way clutch operating automatically to change the drive from a higher speed to direct drive upon slippage of the friction driving connection due to predetermined torque reaction on the driven shaft.

4. A drive shaft, a driven shaft, operative driving connections, including a constantly engageable friction driving connection between said shafts for driving the driven shaft at a higher speed than the speed of the driving shaft, and an overrunning clutch between said shafts for driving the driven shaft at the same speed as the drive shaft, said overrunning clutch being operated automatically to change the drive from the high speed drive to the direct speed drive upon slippage of the friction driving connection due to predetermined torque reaction on the driven shaft.

5. A drive shaft, a driven shaft, operative driving connections including a friction driving connection between said shafts for driving the driven shaft at a higher speed than the speed of the driving shaft, said friction driving connection comprising elements disposed at all times in frictional operative driving engagement with each other, and an overrunning clutch for driving the driven shaft at the same speed as the driving shaft, said overrunning clutch being operated automatically to change the drive from the high speed drive to the direct speed drive upon predetermined torque reaction on the driven shaft.

WILHELM B. BRONANDER.